United States Patent Office 3,404,924
Patented Oct. 8, 1968

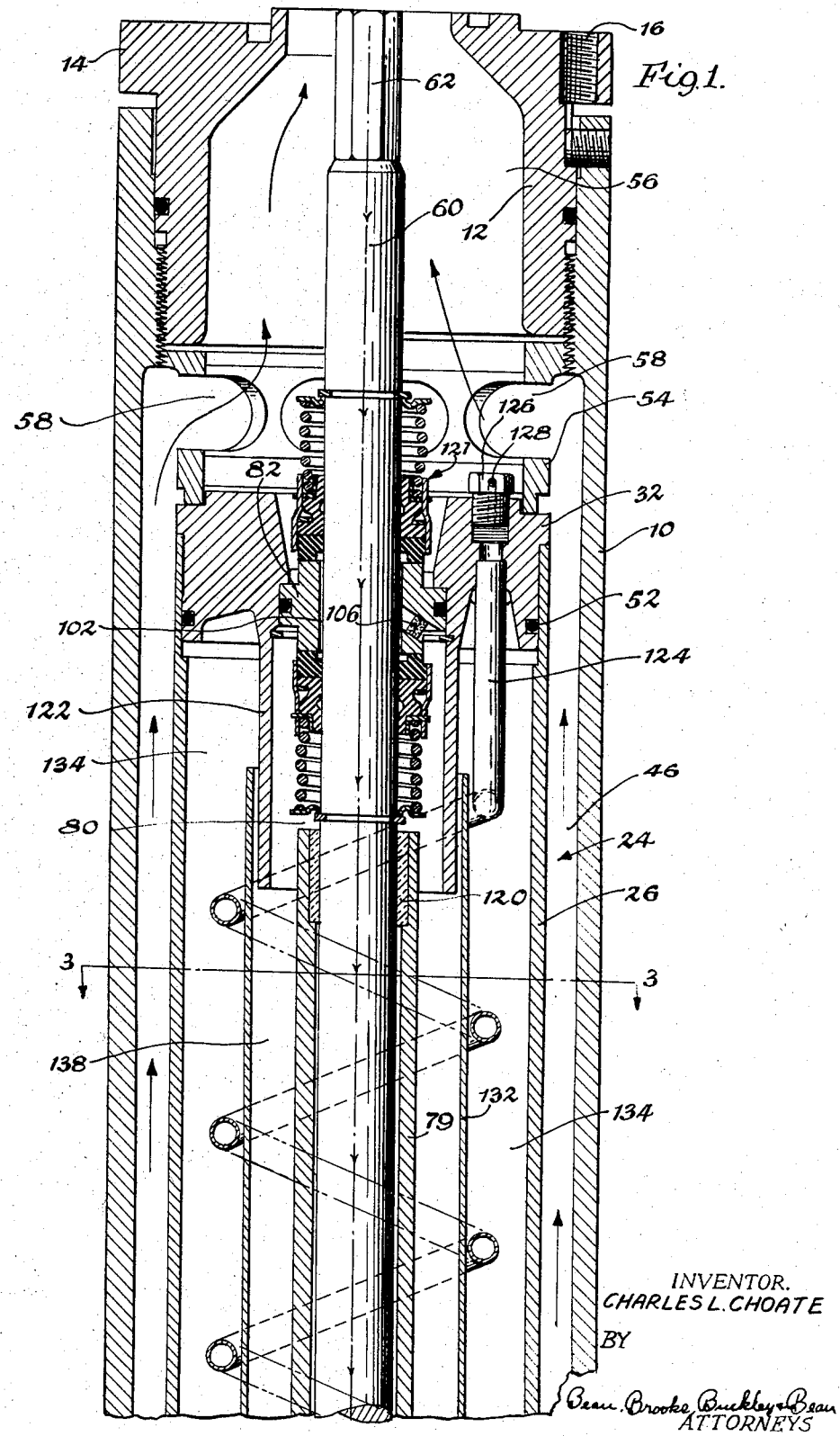

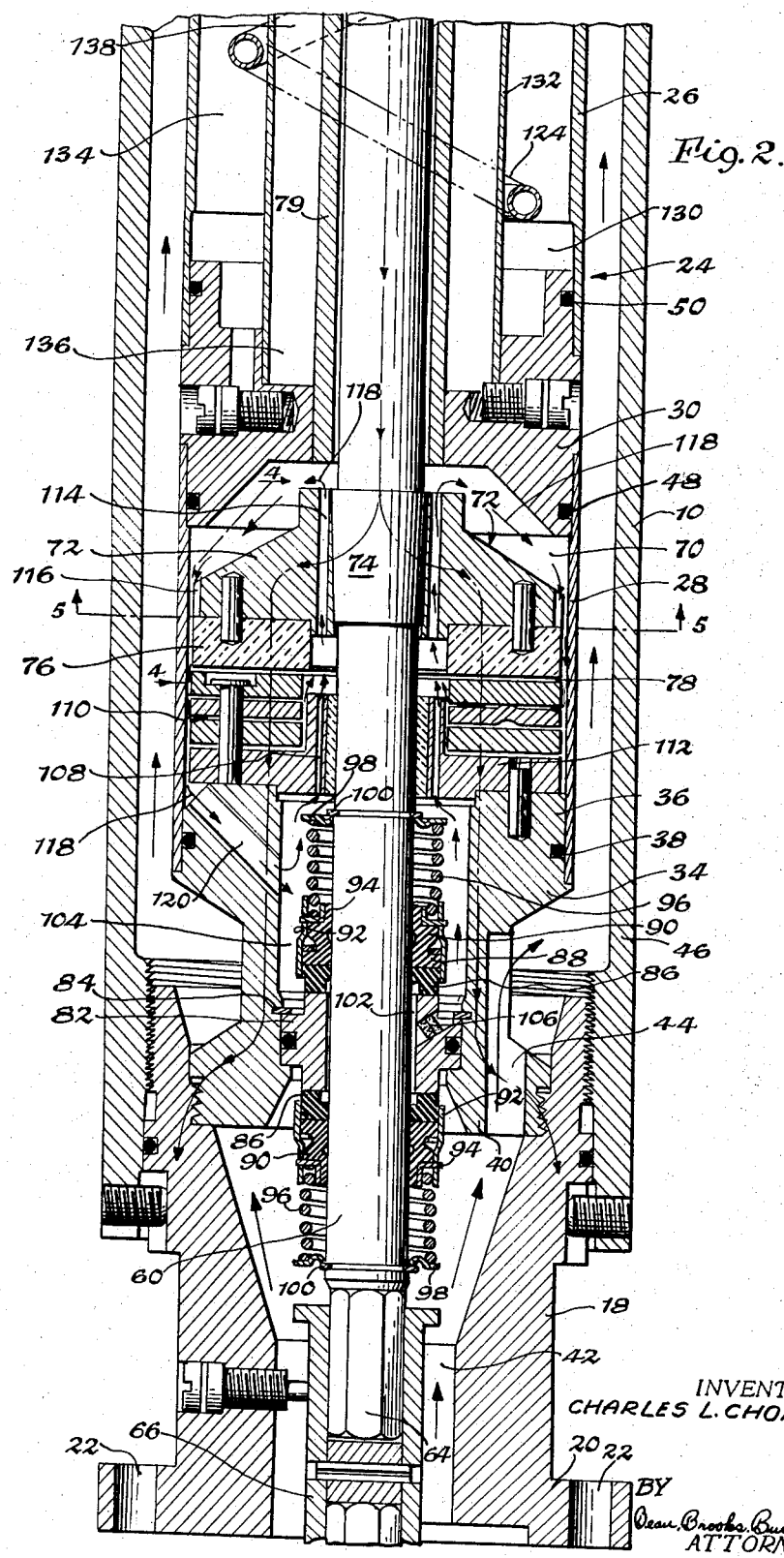

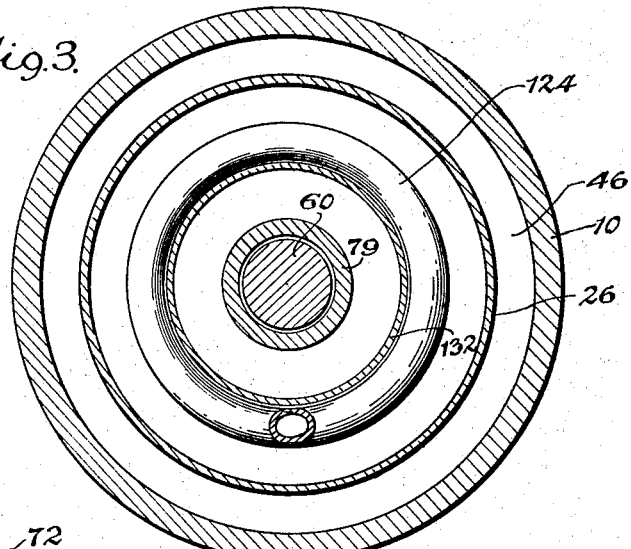
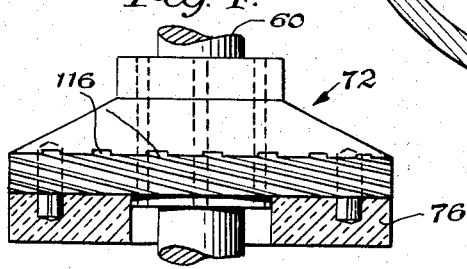
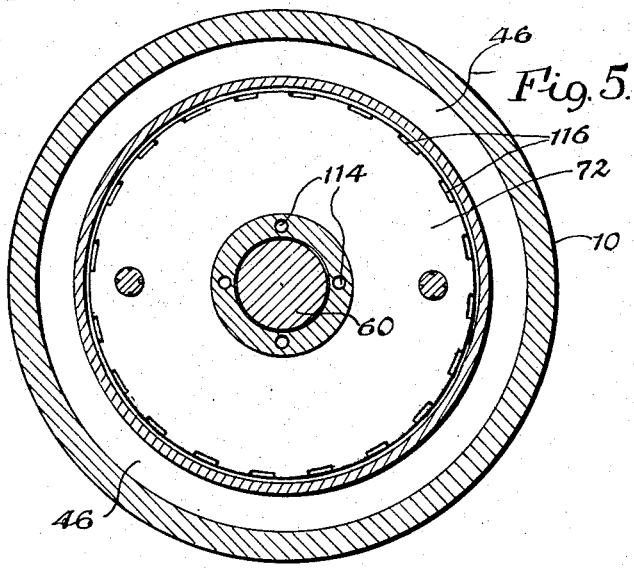

3,404,924
OIL FILLED THRUST BEARING MODULES FOR SUBMERSIBLE PUMPS
Charles Leon Choate, Tulsa, Okla., assignor to Goulds Pumps, Inc., Seneca Falls, N.Y.
Filed Feb. 6, 1967, Ser. No. 614,221
9 Claims. (Cl. 308—36.2)

ABSTRACT OF THE DISCLOSURE

A thrust bearing module providing improved protection from destructive contamination of the lubricating fluid by the ambient liquid being pumped. The construction of the housing and related parts is such as to effectively seal the housing in certain regions while also providing a vent for the lubricant reservoir to the pressure of the ambient fluid. A baffle or labyrinth arrangement is used to control commingling of the lubricant with ambient fluid entering through the vent and to stay as long as is possible the migration of contaminating ambient fluid from within the reservoir to those regions housing the thrust bearing and the seals.

Brief summary and background of the invention

The following patents are indicative of the state of art relating to the general subject matter of this invention: 2,569,741, 10/2/51, 172—36; 2,674,194, 4/6/54; 103—87; 2,674,702, 4/6/54, 310—87; 2,783,400, 2/26/57, 310—87; 2,854,595, 9/30/58, 310—87; 2,951,165, 8/30/60, 310—54; 2,974,240, 3/7/61, 310—87; 3,153,160, 10/13/64, 310—87.

The invention is particularly adapted for use in conjunction with submersible pumps of the type disclosed in Pat. No. 3,115,840 issued Dec. 31, 1963, assigned in common herewith, and is intended to be interposed within a pump-motor string such as is disclosed in that patent for the purpose of transferring the axial thrust imposed by the shafts of the pump units above the thrust bearing assembly to the casing so that the shafts of units therebelow, be they further pumps or a motor, are relieved of the axial thrust burden which would otherwise be imparted thereto. This is particularly useful where a long string of pump modules or motors are utilized.

A suitable thrust bearing per se is disclosed in Pat. No. 3,285,185, issued Nov. 15, 1966, and assigned in common herewith. A problem which may arise in conjunction with the thrust bearing module disclosed in the aforesaid patent is that operation of the thrust bearing causes a temperature rise in the lubricating fluid which in turn results in expansion of the lubricating fluid and consequent fluctuation in differential pressure between the chamber containing the lubricating fluid and the ambient liquid being pumped, which differential pressures may impose a serious burden upon the seals protecting the lubricating fluid and thrust bearing chamber from contamination by the ambient liquid being pumped. In Pat. No. 3,285,185, a pressure compensating membrane 152 is utilized, the same being formed of flexible material to accommodate for volumetric variations due to temperature changes in the lubricating fluid. In some instances, such an arrangement is not entirely adequate and rapid contamination of the lubricating fluid by the ambient liquid being pumped occurs which, particularly by virtue of the location of the thrust bearing assembly in the lower part of the lubricating fluid chamber to which the contamination fluid immediately migrates may cause early failure of the thrust bearing assembly. The reason for this is that the liquid being pumped normally is of higher specific gravity than the lubricating liquid and consequently will settle in the region of the thrust bearing. The thrust bearing assembly receives insufficient lubrication from this contaminating ambient liquid and is characterized by premature failure when this contaminating fluid is effecting the lubrication half of the assembly;

In the drawing:

FIGURES 1 and 2 are sectional views which, when taken together, illustrate the complete assemblage according to the present invention, FIGURE 2 being the bottom half of the assembly;

FIGURE 3 is a cross-section taken generally along the plane of section line 3—3 in FIGURE 1 showing certain details of the internal construction of the device;

FIGURE 4 is an elevational view as indicated by section line 4—4 in FIGURE 2 showing the thrust bearing hub and illustrating the pumping vanes therein; and FIGURE 5 is a cross-section taken generally along the plane of section line 5—5 in FIGURE 2 showing further details of the thrust bearing hub.

Referring to FIGURE 1, the assembly will be seen to include an outer casing 10 of tubular form and within the upper end of this casing is received an adapter member 12 having a flange 14 provided with a plurality of threaded openings 16 by means of which the adapter 12 is connected to the lower end of a pump module such as the module 18 shown in FIGURE 2 of Pat. No. 3,115,840. The lower end of the casing 10 is shown in FIGURE 2 herein and as will be appreciated therefrom, contained in its lower end as by threaded connection, is a lower adapter 18 which also is provided with a flange 20 having suitable openings 22 therein for receiving fasteners by means of which the lower end of the thrust bearing assembly may be connected to a motor unit such as the unit 16 shown in FIGURE 3 of the aforesaid Pat. No. 3,115,840, or to the upper end of a pump module unit such as that previously referred to and identified by reference character 18 in FIGURE 2 of such patent. That is to say, the thrust bearing assembly may be interposed as is necessary or desirable within a pump-motor string as is fully disclosed in Pat. No. 3,285,185.

Contained within the casing 10 between the adapters 12 and 18 is a thrust bearing housing indicated generally by the reference character 24 and which, as shown, may be made conveniently from several component parts.

In the specific embodiment disclosed, this housing comprises upper and lower sleeve members 26 and 28 connected together by the divider member 30 and with the respective upper and lower ends of the housing being closed by the end members 32 and 34. The lower end member 34 consists of an upper body portion 36 over which the lower end of the sleeve 28 is slip-fitted and suitably sealed as by an O-ring 38 and the lower portion 40 of this end member is threadedly engaged directly to the adapter member 18. The adapter member 18 is provided with an opening 42 through which the ambient fluid being pumped passes and the end member 34 is provided with a plurality of openings 44 effecting a continuation of this passage leading into the annular passage region 46 defined between the inner surface of the casing 10 and the housing assembly 24.

The upper end of the sleeve 28 is slip-fitted over the lower end of the divider member 30 and is provided with an O-ring seal 48 whereas the lower end of the sleeve 26 is slip-fitted over the upper portion of the divider 30 and is provided also with an O-ring seal 50.

The upper end of the sleeve 26 is slip-fitted over the upper end member 32 and is provided with an O-ring seal 52 engaging the inner surface of the sleeve 26. A compression collar 54 which is engaged threadedly with the casing 10 and bears against the upper surface of the upper end member 32 serves to locate the several parts comprising the housing 24 and prevents their longitudinal separation, as will be apparent.

The upper adapter 14 is provided with an opening 56 to pass the fluid being pumped and suitable openings 58 are provided in the compression collar 54 to communicate the aforementioned passage 46 with opening 56 to complete the direct passage of ambient fluid being pumped from the lower to the upper end of the module.

The drive shaft or drive transmitting shaft 60 extends between the opposite ends of the module and is provided at its opposite ends with splines or flatted portions 62 and 64 whereby drive connection through suitable sleeves such as that indicated by the reference character 66 may be effected. It is to be appreciated that the drive coupling effected between the upper end 62 of the drive shaft 60 and the drive shaft of the unit next above is of the type utilizing an intervening thrust button or shims to transmit the overlying axial thrust to the drive shaft 60 in the manner disclosed for example in Pat. No. 3,285,185 (see drive sleeve 166 and thrust button 164) or in the manner of the sleeve 44 and thrust button 62 of Pat. No. 3,115,840.

The divider 30 separates the interior of the housing 10 into a lower chamber 70 and an upper chamber thereabove, the upper chamber being in the form of a labyrinth as will be disclosed more particularly hereinafter. The lower chamber 70 contains the thrust bearing assembly indicated generally by the reference character 72.

This thrust bearing assembly may be of any desired configuration and may be substantially identical, for example, to the thrust bearing assembly specifically disclosed in Patent No. 3,285,185. The thrust bearing is of the Kingsbury type and although the specific details thereof are not necessary for a proper understanding of the present invention, it does include a hub portion 72 receiving the tapered portion 74 of the shaft 60 and which hub rotates with the shaft. The hub 72 carries a bearing ring 76 and at the interface 78 between the rotating parts of the thrust bearing which are above this interface and the stationary parts of the thrust bearing which are below this interface, a film of lubricant is formed which resists in shear the axial downward force imposed upon the thrust bearing.

The only means of communication between the lower chamber 70 and the upper chamber of the housing 24 is by means of a stand pipe 79 carried at its lower end by the divider 30 as seen in FIGURE 2 and surrounding the shaft 60 in upward extending relation within the upper chamber of the housing to terminate within an upper region 80 of such upper chamber of the housing 24. It will be appreciated that both the upper and lower chambers of the housing 24 will be filled with a suitable lubricating fluid such as oil.

A double-seal arrangement is provided at both the upper and lower ends of the housing 24 and which seals engage the shaft 60 normally to preclude the entrance of the ambient fluid being pumped into the confines of the housing 24.

The reason for this, as has been stated, is to protect the thrust bearing assembly from the presence of the contaminating ambient fluid so that premature failure or wear of this thrust bearing does not occur. The double-seal assemblies are identical in both cases and a specific disclosure of only one will be given here, like reference characters being used where appropriate for the purpose of clarity. Referring to the lower portion of FIGURE 2, the double-seal arrangement shown therein comprises a stationary collar 82 having a shoulder received within a counterbore portion of the lower end member 34 and held captive therein as by a retaining clip or ring 84. Bearing against the upper face of the stationary collar 82 is a ring 86 which may be made, for example, of carbon and bearing in turn upon this ring, is the lower or foot portion 88 of a deformable sealing collar or sleeve 90. The sleeve 90 is carried within a tubular housing 92 and is backed up by a collar 94 carried by the housing 92. The collar 94 serves also as a seat for the compression spring 96 acting between this collar and the washer 98 bearing against the retaining ring 100 carried by the shaft 60. The ring 86, seal 90 and the parts 92, 94, 96, 98 and 100 rotate with the shaft 60, the spring 96 serving simultaneously to cause the seal 90 to seal against the shaft and the ring 86 to bear against the collar 82. Sufficient pressure is exerted by the rotating ring 86 against the stationary collar 82 to effect a seal at this interface.

An identical seal arrangement (as indicated by corresponding reference characters) is provided in bearing engagement against the lower face of the stationary collar 82. The two seals form a double seal arrangement in cooperation with the collar 82. The region between the double seals at the lower end of the shaft defines a seal lubricant chamber 102 which is in one-way communication with the interior chamber 104 of the housing. Consequently, pressure balance or equalization between the chambers 102 and 104 normally is achieved but without the danger of contamination of the lubricating fluid by passage of ambient fluid from the chamber 102 to the chamber 104. This is accomplished by means of a foraminous plug member 106 which has the property of allowing the passage therethrough only of that fluid which has first wetted this member. The two seals of each double-seal assembly operate such that should one open, the other will be more forcefully closed so that at no time can the lower chamber 104 be in direct communication with the ambient fluid being pumped and the worst that can happen is that either lubricating fluid will be bled externally from the chamber 102 or ambient fluid can enter chamber 102. If the latter, the ambient fluid cannot progress through the plug 106 and remains trapped in the chamber 102. Thereafter, differential pressure will allow lubricating fluid to enter the chamber 102 through the plug 106 and may ultimately displace the ambient fluid which may have become trapped therein. The plug 106 may be of sintered bronze filter plug material available from the Burgess-Norton Mfg. Co. of Geneva, Illinois, and identified as EMS No. C-3, grade 60.

The aforementioned chamber 104 is in communication with the chamber 70 which houses the thrust bearing assembly, through the medium of a plurality of openings 108 in the hub 110 of the stationary thrust bearing of openings 108 in the hub 110 of the stationary thrust bearing member 112 and through the medium of further openings or passages 114 in the hub 72 of the thrust bearing.

Because the lubricating fluid in the lower chamber 70 is subjected to mechanical work, its temperature will normally tend to be raised above that of the ambient fluid being pumped and in order to minimize such elevation of temperature of the lubricating fluid, the hub member 72 is provided with peripheral blades or vanes 116 (see particularly FIGURE 4) which effect circulation of the lubricating fluid between the chambers 70 and 104 in the fashion indicated by the arrows 118, there being provided a direct passage 120 communicating the upper and lower chambers through the lower end member 34. In this connection, it will be noted that the sleeve 28 is slightly oversize with respect to the thrust bearing assembly to provide an annulus through which the lubricating fluid is forced to flow and it is a feature of this invention that the sleeve 28 is of thin wall construction particularly at this point so as to allow a maximum of heat transfer from the lubricating fluid to the ambient fluid being pumped.

The lower chamber 70 is, on the other hand, somewhat isolated from the main lubricant reservoir above the divider 30, the only means of communication therebetween being through the annulus around the shaft 60 between the shaft and the stand pipe 79. Preferably, the upper end of the stand pipe 79 carries a filter member 120 allowing passage of the lubricating fluid but serving to prevent the passage of foreign matter which might tend to be destructive to the thrust bearing.

The upper end member 32 is provided with a double-seal assembly 121 identical with that previously described and with a depending skirt portion 122 which overlaps the upper end of the stand pipe 79. The skirt 122 prevents the rotating seal from agitating the lubricating fluid in the reservoir 134. A vent pipe 124 communicating the main lubricant reservoir 134 at the exterior of the housing through a plug member 126 having a restricted passage 128 leading to the open upper end of the vent tube 124. The lower end of the vent tube 124 discharges or communicates directly with the lower region 130 of the main lubricant reservoir shown in FIGURE 2. It is a feature of this invention that the vent tube is helical as shown so that during shipping, even if the assembly is placed on its side, only a small amount of lubricating fluid can leak from the main reservoir through the vent tube.

During operation of the device, a rise in temperature of the lubricating fluid can cause volumetric expansion thereof to bleed some of the lubricant outwardly through the opening 128 to be carried away with the ambient fluid being pumped and fluctuations of the volume occupied by the lubricating fluid can intermittently induct some of the ambient fluid into the vent tube 124 where, by reason of the fact that the ambient fluid normally will be of higher specific gravity than the lubricant, the contaminating fluid will migrate directly to the lower region 130 previously described.

In order to allow substantial contamination of lubricant in the main reservoir without permitting the contaminating fluid to contact either of the double seals or the thrust bearing assembly, a first labyrinth tube 132 is provided defining the aforementioned reservoir 134 in the form of an outer annulus between the sleeve 126 and the labyrinth tube 132, the lower end of which is the previously mentioned region 130 to which the vent tube is communicating. The upper end of the labyrinth tube 132 extends above the lower edge of the skirt 122 so that even when the annulus 134 is substantially completely filled with contaminating fluid, it can only spill over the upper end of the labyrinth tube 132 and initially migrate only to the lower region 136 of the annulus 138 defined between the labyrinth 132 and the stand pipe 79. It is only when the annulus 138 is completely filled that contaminating liquid can come into contact either with the lower or the upper double seals or can migrate to the region of the thrust bearing assembly.

Thus, even though the lubrication fluid is effectively in direct pressure communication with the ambient fluid being pumped, it is nevertheless the case that contamination of lubricant in the region of either of the double seals or of the thrust bearing is stayed by a maximum amount.

I claim:

1. A thrust bearing module for interposition within a submersible pump-motor string, comprising in combination, a casing having means at each end for connections within a submersible pump-motor string as aforesaid and providing openings for passing the ambient fluid being pumped for passage through said casing, a thrust bearing housing disposed within said casing and defining a passage with the inner surface of said casing for passage of the pumped fluid through the casing, a drive shaft extending through said module, seal means at the opposite ends of said housing and engaging said shaft for precluding the entry of ambient fluid into the interior of said housing at those points, a thrust bearing within the lower region of said housing for transferring axial downward forces on said shaft to said casing, the improvement comprising, means within said housing separating the interior thereof into a lower chamber containing said thrust bearing and an upper chamber constituting a reservoir, both chambers being filled with lubricant, a stand pipe mounted on said means and extending upwardly therefrom in surrounding relation to said shaft and having an open upper end communicating said lower chamber with said reservoir in an upper region of the latter, and vent means communicating the lower region of said reservoir, remote from said open upper end of the stand pipe, with the exterior of said housing.

2. The thrust bearing module defined in claim 1 wherein said vent means comprises a helically wound pipe.

3. The thrust bearing module defined in claim 2 wherein said thrust bearing includes a member rotatable with said drive shaft for circulating lubricant within said lower chamber.

4. The thrust bearing module defined in claim 1 wherein said thrust bearing includes a member rotatable with said drive shaft for circulating lubricant within said lower chamber.

5. The thrust bearing module defined in claim 1 wherein the seal means at the lower end of said shaft comprises a pair of spaced, opposed seals defining a seal lubricant therebetween around said shaft, and a foraminous plug member communicating said seal lubricant chamber with said lower chamber and effective to pass only lubricant therethrough.

6. The thrust bearing module defined in claim 5 wherein said thrust bearing defines an annulus between it and said housing, said thrust bearing including a member rotatable with said drive shaft for circulating lubricant within said lower chamber through said annulus whereby lubricant in said lower chamber is constantly in circulating heat-exchange relation with ambient fluid through the wall of said housing associated with said annulus.

7. The thrust bearing module defined in claim 1 wherein said thrust bearing defines an annulus between it and said housing, said thrust bearing including a member rotatable with said drive shaft for circulating lubricant within said lower chamber through said annulus whereby lubricant in said lower chamber is constantly in circulating heat-exchange relation with ambient fluid through the wall of said housing associated with said annulus.

8. In a thrust bearing module for interposition within a submersible pump-motor string, a casing having means at each end for connections within a submersible pump-motor string as aforesaid and providing openings for passing the ambient fluid being pumped for passage through said casing, a thrust bearing housing supported in said casing and defining therewith a passage between said openings, a drive shaft extending through said housing, a thrust bearing within said housing for transferring axial downward forces on said shaft to said casing, seal means at those portions of said housing whereat said shaft passes therethrough for precluding the entry of ambient fluid into the interior of said housing, said interior of the housing defining a reservoir containing lubricant, the improvement residing in each said seal means and comprising, a sleeve portion surrounding each portion of said shaft projecting through said housing and forming an annular chamber with the shaft, an inner seal carried by said shaft and bearing against one end of said sleeve to isolate said chamber from the interior of said housing, an outer seal carried by said shaft and bearing against the other end of said sleeve to isolate said chamber from the interior of said casing, and means venting said chamber to the interior of said housing.

9. In the thrust bearing module as defined in claim 8 wherein the last mentioned means includes a sintered filter member.

References Cited

UNITED STATES PATENTS 3,153,160   10/1964   Carle _____ 310—87
3,285,185   11/1966   Feltus _____ 103—87

MARTIN P. SCHWADRON, *Primary Examiner.*

C. B. DORITY, *Assistant Examiner.*